Aug. 31, 1937.  F. H. LE JEUNE  2,091,602
COMPOSITE WHEEL
Filed May 18, 1936  2 Sheets-Sheet 1
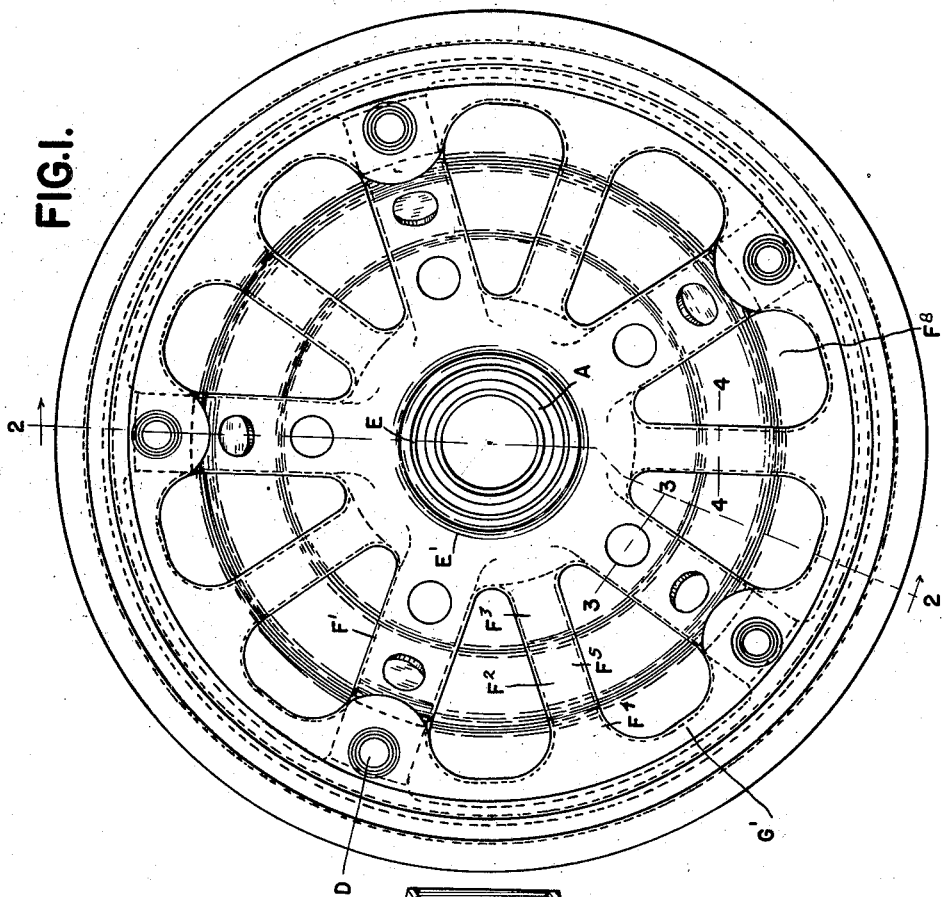
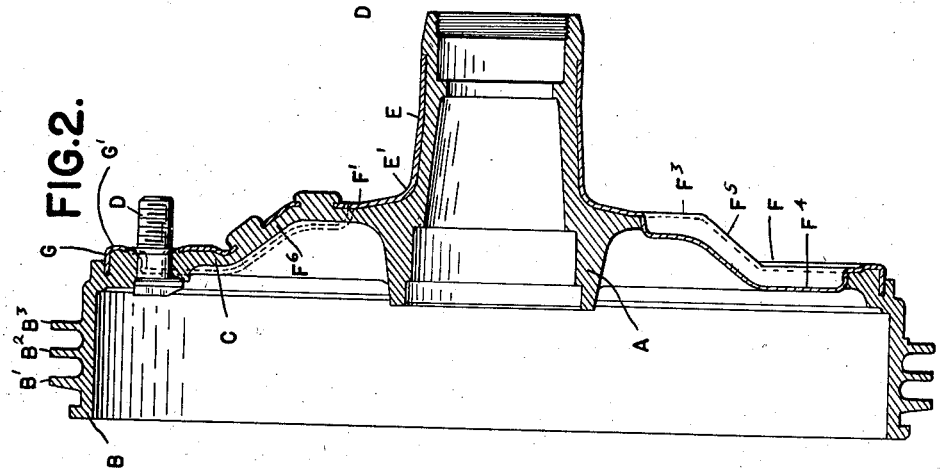
INVENTOR
FRANK H. LeJEUNE
BY Whittemore Hulbert
Whittemore & Belknap
ATTORNEYS Aug. 31, 1937.　　　　F. H. LE JEUNE　　　　2,091,602
COMPOSITE WHEEL
Filed May 18, 1936　　　　2 Sheets-Sheet 2
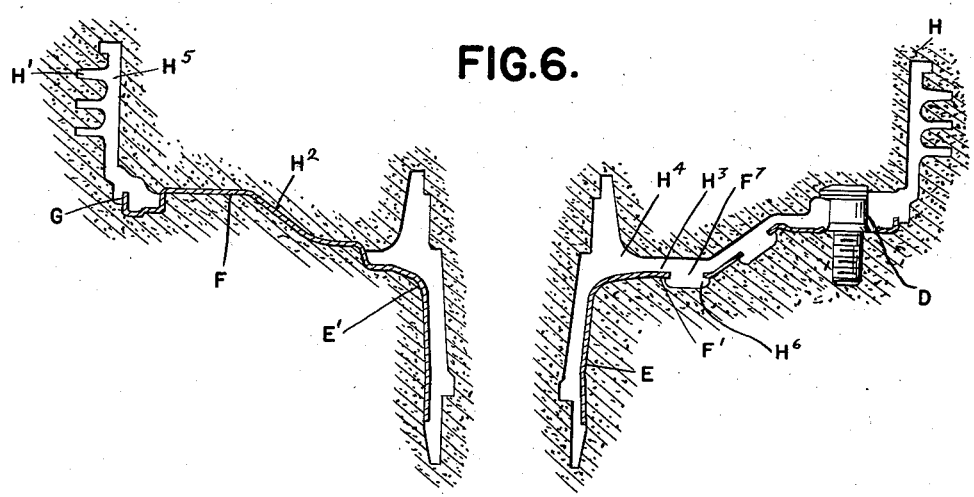
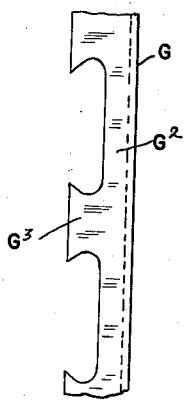
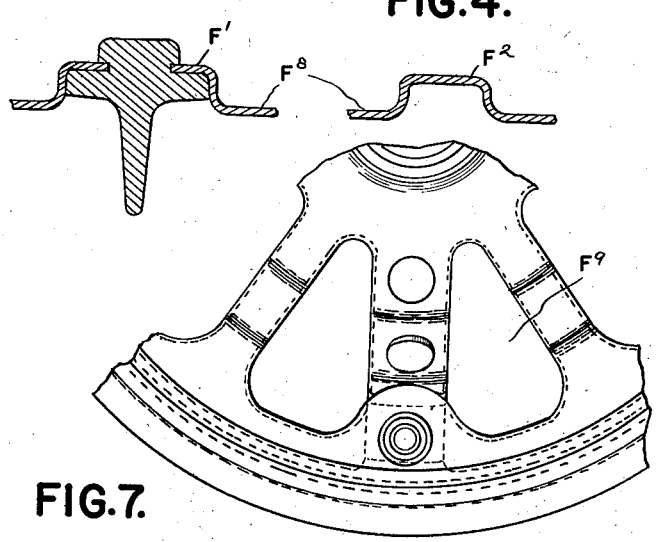
INVENTOR
FRANK H. LeJEUNE
BY Whittemore Hulbert
Whittemore & Belknap
ATTORNEYS Patented Aug. 31, 1937

2,091,602

UNITED STATES PATENT OFFICE 2,091,602

COMPOSITE WHEEL

Frank H. Le Jeune, Detroit, Mich., assignor to Kelsey-Hayes Wheel Company, Detroit, Mich., a corporation of Delaware Application May 18, 1936, Serial No. 80,447

10 Claims. (Cl. 301—6)

The invention relates to vehicle wheels and more particularly to that type in which the hub and brake drum are in fixed relation to each other and form a mounting for the tire engaging rim. Wheels of this type have heretofore been made both of cast metal and of pressed sheet metal. The cast metal structures have the advantage of forming a better braking surface and for also imparting rigidity to portions of the structure where rigidity is a desirable characteristic. On the other hand, for certain portions of the structure cast metal is not as desirable as the pressed sheet metal, as for instance in the intermediate portion between the hub and the brake drum. From the standpoint of manufacture, there is an advantage in the cast metal structure that it is cast as a unit, whereas the pressed sheet metal structure requires a series of operations and a large number of separate dies. Again, the cast structure generally requires a greater weight of metal than the pressed sheet metal structure and is more liable to be broken by an abnormal shock.

The object of the present invention is to obtain a construction which combines the advantages and, to a large extent, eliminates the objections to both types of construction, above described. To this end, the invention consists in a composite structure in which the cast metal is retained in those parts for which it is particularly adapted, while a pressed sheet metal element is combined therewith as a reinforcement. The invention further consists in the peculiar construction of this composite structure as hereinafter set forth.

In the drawings:

Figure 1 is a side elevation of my improved wheel;

Figure 2 is a cross-section thereof on line 2—2 of Figure 1;

Figures 3 and 4 are cross-sections respectively on lines 3—3 and 4—4 of Figure 1;

Figure 5 is an elevation of the periphery of the sheet metal element;

Figure 6 is a view similar to Figure 2 showing the mold with the pressed sheet metal element therein prior to the pouring of the cast metal;

Figure 7 is an elevation similar to a portion of Figure 1 showing a modification.

The specific design of my improved wheel may be varied according to the particular vehicle with which it is to be used, but essentially it comprises a hub A for either the steering or driving wheels, a brake drum B and an intermediate connecting portion C. There is also provided attachment means for the demountable tire engaging rim which as shown consists of bolts or studs D anchored in the intermediate portion C and projecting laterally therefrom. The specific construction of the tire engaging rim and cific construction of the tire engaging rim and elements demountable therewith forms no part of the present invention and is, therefore, not illustrated or described.

The sheet metal element of my improved wheel consists of a hub portion E, a series of radially projecting spoke portions F, and an annular peripheral portion G. The hub portion E, preferably surrounds the outwardly projecting portion of the cast metal hub and is connected by a curved portion E' with the spokes F. The latter are preferably of channel-shaped cross-section, as shown at F', F², Figures 3 and 4, and also in a radial direction have offset portions F³ and F⁴ connected by an obliquely extending portion F⁵. The peripheral portion G preferably has an annular portion G' in a radial plane and an annular portion G² extending axially and provided with a series of spaced dovetail projections G³.

The pressed sheet metal member as just described is adapted to be placed within the mold cavity of a mold H for the cast metal element. This mold is also preferably fashioned to form a series of radially outwardly extending annular cavities H' for forming flanges B', B², B³ on the drum portion B. It is further provided with mold cavities H² for receiving the spokes F and with parallel cavities H³ for certain of the spokes as F' adapted to form cast spokes F⁶, as well as furnishing channels which connect the mold cavities H⁴ and H⁵ respectively for the hub A and the brake flange B.

With the construction as thus far described the method of forming my improved wheel is as follows: The mold H is first formed with all of the cavities as above described, after which the pressed sheet metal element is placed within the mold engaging the cavities designed to receive the same. The securing bolts G may also be placed in position in cavities provided therefor. The molten metal is then poured which will fill all unoccupied portions of the mold cavity coming in contact with the sheet metal element which latter may either be preheated or receive its heat from the molten metal. This may form a bond by fusion, but instead of depending on such bonding, I provide a mechanical interlock which will firmly unite the two parts of the structure. Thus, the annular portion G² has the dovetail projections G³ which are completely embedded in the cast metal and form an interlock. The cast hub portion is surrounded by the pressed sheet metal hub portion E and the spoke portions are also interlocked at one or more points. This interlock is formed by providing apertures $F^7$ in the channel-shaped spokes $F'$ and also forming mold cavities $H^6$ on opposite sides of the spokes $F'$ from the cast metal spoke and of a larger diameter than the apertures $F^7$. These cavities will be filled with molten metal which will thus form a headed stud connecting the cast metal to the sheet metal. If desired, the pressed sheet metal member may have a continuous web $F^8$ extending between the adjacent channel-shaped portions $F'$ and $F^2$ which will contribute an additional element to strength, or on the other hand, the sheet metal may be cut away at $F^9$ between the spokes as shown in Figure 7, if this is desired.

My composite wheel constructed as above described, utilizes the inherent characteristics of the pressed sheet metal and cast metal structures at points where they are the most advantageous in contributing to strength, rigidity or flexibility, as desired.

What I claim as my invention is:

1. A composite wheel comprising a cast metal element and a pressed sheet metal element each having a hub portion, a rim portion and an intermediate portion all integral, the corresponding portions of said elements being anchored to each other.

2. A composite wheel comprising a cast metal element and a pressed sheet metal element each having a hub portion, a rim portion and an intermediate portion, the rim portion of said sheet metal element having anchors embedded in the rim portion of said cast element and the hub portion of said sheet metal element surrounding the cast hub.

3. A composite wheel comprising a cast metal element and a pressed sheet metal element each having a rim portion, a hub portion and an intermediate portion, said pressed sheet metal element forming an outer facing for said cast element and having its hub portion surrounding the cast hub, its rim portion provided with anchors embedded in the cast rim portion and the intermediate portion radially channeled to embrace the corresponding portion of the cast element.

4. A composite wheel comprising a cast metal element and a pressed sheet metal element each having a hub portion, a rim portion and radial spokes connecting said portions, the corresponding portions of said cast metal and pressed sheet metal elements being anchored to each other and said sheet metal spokes being channeled to embrace the cast metal spokes.

5. A composite wheel comprising a cast metal element and a pressed sheet metal element each having a hub portion, a rim portion and radial spokes connecting said portions, the corresponding portions of said cast metal and pressed sheet metal elements being anchored to each other and said sheet metal spokes being channeled to embrace the cast metal spokes, the web of said sheet metal channel being apertured and said cast metal spoke having portions engaging opposite sides of the sheet metal integrally connected by a portion extending through said aperture.

6. A composite wheel comprising a cast metal element and a pressed sheet metal element each having a hub portion, a rim portion and an intermediate portion, the intermediate portion of said pressed sheet metal element having a series of radially extending spokes of channel cross-section certain of said spokes embracing the intermediate portion of said cast metal element.

7. A composite wheel comprising a cast metal element and a pressed sheet metal element, said cast metal element having a hub portion, a brake drum portion and intermediate connecting spokes, said pressed sheet metal element having a rim portion provided with anchors embedded in the brake drum portion of said cast element, a hub portion surrounding said cast hub and a series of radially extending spokes of channel cross-section, certain of said pressed metal spokes embracing the cast spokes and certain of said pressed metal spokes being intermediate said cast spokes.

8. A composite wheel comprising a cast metal element and a pressed sheet metal element, said cast element having a hub portion, a brake drum portion and radially extending connecting spokes with the portions thereof respectively adjacent said hub and brake drum offset from each other and connected by an obliquely extending portion, said pressed sheet metal element having a rim portion with anchors extending therefrom embedded in the brake drum portion of said cast element, a hub portion surrounding said cast hub and a series of spokes of channel cross-section being radially fashioned to correspond to said cast spokes, certain of said sheet metal spokes embracing said cast spokes and certain of said sheet metal spokes being intermediate said cast spokes, and ribs on said cast spokes directly connecting the hub with the offset portion adjacent to said brake drum.

9. A composite wheel comprising a cast metal element and a pressed sheet metal element each having a hub portion, a rim portion and an intermediate portion all integral, the rim portion of said sheet metal element being anchored in the rim portion of said cast element, the hub portion of said sheet metal element surrounding the cast hub and the intermediate portion of said sheet metal element reinforcing the intermediate portion of the cast element.

10. A composite wheel comprising a cast metal element and a pressed sheet metal element each having a hub portion, a rim portion and an intermediate portion all integral, the rim portion of said sheet metal element being anchored in the rim portion of said cast element, the hub portion of said sheet metal element surrounding the cast hub and the intermediate portion of said sheet metal element forming a continuous web reinforcing the intermediate portion of the cast element.

FRANK H. LE JEUNE.